United States Patent [19]

Powell

[11] Patent Number: 4,496,746

[45] Date of Patent: Jan. 29, 1985

[54] SYNTHESIS OF ALKENYL SATURATED ALIPHATIC POLYCARBOXYLIC ACID ANHYDRIDES

[75] Inventor: Justin C. Powell, Fairfax, Va.

[73] Assignee: Texaco Inc., White Plains, N.Y.

[21] Appl. No.: 394,065

[22] Filed: Jul. 1, 1982

[51] Int. Cl.³ ............................................. C07D 307/60
[52] U.S. Cl. .................................... 549/255; 549/231; 252/363.5
[58] Field of Search ................................ 549/255, 231

[56] References Cited

U.S. PATENT DOCUMENTS

| 4,086,251 | 4/1978 | Cengel et al. | 549/255 |
| 4,235,786 | 11/1980 | Wisotsky | 549/255 |
| 4,278,604 | 7/1981 | Powell | 549/255 |

FOREIGN PATENT DOCUMENTS 2273014 12/1975 France .

OTHER PUBLICATIONS

Stover et al., Chem. Abstracts, vol. 89, 62248, (1979).
Popovich et al., Chem. Abstracts, vol. 79, 92751, (1973).

*Primary Examiner*—Henry R. Jiles
*Assistant Examiner*—Bernard I. Dentz
*Attorney, Agent, or Firm*—Robert A. Kulason; Carl G. Seutter

[57] ABSTRACT

Reaction of maleic acid anhydride with olefin oligomers is facilitated by reacting the maleic acid anhydride in the form of a dispersion or emulsion in a carrier fluid. This minimizes by-product sludge formation.

10 Claims, No Drawings

SYNTHESIS OF ALKENYL SATURATED ALIPHATIC POLYCARBOXYLIC ACID ANHYDRIDES

FIELD OF THE INVENTION

This invention relates to a novel composition containing an unsaturated discarboxylic acid anhydride such as maleic acid anhydride. More specifically it relates to use of a dispersion or emulsion of a maleic acid anhydride in a process for preparation of an alkenyl succinic acid anhydride.

BACKGROUND OF THE INVENTION

As is well known to those skilled in the art, alkenyl-substituted succinic acid anhydrides may be made by the reaction of maleic acid anhydride and olefins. It is desirable to avoid formation of by-product sludge resulting in part from the low solubility of maleic acid anhydride in the olefin oligomer.

It is an object of this invention to obtain improved yield of desired product alkenyl-substituted succinic acid anhydride and to decrease by-product sludge formation. Other objects will be apparent to those skilled in the art.

STATEMENT OF THE INVENTION

In accordance with certain of its aspects, this invention is directed to a composition comprising
 (i) a non-aqueous, inert, diluent-solvent;
 (ii) an anhydride of an unsaturated aliphatic polycarboxylic acid dispersed in said non-aqueous, inert, diluent-solvent, and
 (iii) a dispersing amount of a dispersing agent.

In accordance with certain of its other aspects, this invention is directed to a method of preparing a product anhydride of an alkenyl saturated aliphatic polycarboxylic acid which comprises reacting at 150° C.–300° C.
 (i) an olefin oligomer reactant of molecular weight $\overline{M}_n$ of 250–5000; and
 (ii) an anhydride of an unsaturated aliphatic polycarboxylic acid, in amount of 0.5–5 moles per mole of olefin oligomer reactant, dispersed, in the presence of a dispersing amount of a dispersing agent, in a non-aqueous inert diluent-solvent thereby forming product anhydride of an alkenyl aliphatic polycarboxylic acid; and recovering said product anhydride of an alkenyl aliphatic polycarboxylic acid.

DESCRIPTION OF THE INVENTION

The unsaturated aliphatic polycarboxylic, preferably dicarboxylic, acid anhydrides which may be employed in practice of this invention may be intramolecular anhydrides typified by the following:

TABLE

| | |
|---|---|
| maleic | anhydride |
| citraconic | anhydride |
| itaconic | anhydride |
| ethylmaleic | anhydride |
| halo (eg chloro) maleic | anhydride |
| glutaconic | anhydride, etc. |

The preferred anhydride may be maleic acid anhydride.

In practice of the process of this invention, 50–500 parts, preferably 50–200 parts, say 100 parts of the anhydride of an unsaturated aliphatic polycarboxylic acid may typically be added to 25–2000 parts, preferably 500–1500 parts, say 1000 parts of non-aqueous, inert, diluent-solvent.

When the diluent-solvent is one which is desirably present in the final composition, the amount used may fall at the upper end of the range — or even above. In this instance only practical considerations dictate the maximum (or preferred) quantity to be employed. When the diluent solvent is one which is to be removed by distillation, then it is preferred to operate in the lower portion of the range (e.g. 25–500, typically 50–200, say 100).

The preferred non-aqueous inert, diluent-solvents may include compositions which are liquids under the conditions at which the anhydride is to be handled. The preferred solvents have a boiling point greater than about 80° C. and preferably 150° C.–500° C., say about 300° C. In the case of the preferred maleic acid anhydride, the preferred diluent-solvent may be one having a boiling point of 250° C.–350° C., or higher.

The most preferred inert diluent-solvents may include liquid hydrocarbons including aliphatic hydrocarbons such as n-octadecane, hydrogenated decen-1 oligomer etc. or aromatic hydrocarbons such as methyl anthracene, dodecylbenzene, etc. Commercial mixtures may be employed such as naphtha, kerosene, etc. A particularly preferred diluent-solvent may be a paraffinic or maphthenic lubricating oil stock having a kinematic viscosity at 40° C. of 100 CS.

It is a feature of this invention that the inert diluent-solvent may contain the olefin oligomer (of molecular weight $\overline{M}_n$ of 250–5000) with which the anhydride is to be reacted. In one embodiment, the inert diluent-solvent may consist essentially of polyisobutylene oligomer. These inert diluent-solvents are characterized by the absense of undesirable effect upon the reactants and the reaction.

There is also added to the composition a dispersing amount of a dispersing agent. This may be 1,000–200,000 parts per million, preferably 5,000–50,000 ppm, say 10,000 ppm, based on charge anhydride. The dispersing agent may be an anionic dispersant, a cationic dispersant, or a non-ionic dispersant.

When the dispersant is an anionic dispersant, it may typically be:

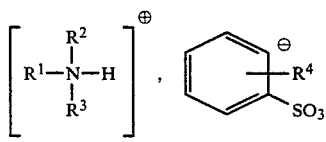

wherein $R_1$ is a $C_1$–$C_4$ alkyl, preferably isopropyl; $R_2$ is hydrogen or $C_1$–$C_4$ alkyl, preferably hydrogen; $R_3$ is $C_1$–$C_4$ alkyl or benzyl or hydrogen, preferably hydrogen; and $R_4$ is $C_6$–$C_{18}$ alkyl, preferably branched chain $C_{12}$ alkyl.

When the dispersant is cationic dispersant, it may typically be:

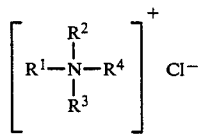

wherein $R_1$ is $C_1$–$C_4$ alkyl, preferably methyl; $R_2$ is $C_1$–$C_4$ alkyl, preferably methyl; $R_3$ is $C_1$–$C_4$ alkyl or benzyl, preferably benzyl; $R_4$ is $C_{12}$–$C_{20}$ alkyl or alkenyl, preferably octadecyl or oleyl.

When the dispersant is a non-ionic dispersant, it may typically be:

$$R—x—[(CH_2CH_2O)_m (CH_2CH_2OH)]_p$$

wherein R is $C_6$–$C_{24}$ alkyl; X is oxygen, sulfur, or —$C_6H_4O$— (when p is 1); X is nitrogen or —C—N— (when p is 2).

The prefered dispersants are ionic dispersants typified by an isopropyl ammonium salt of a branched chain dodecyl benzene sulfonic acid.

Although it may be possible to form the dispersion by adding maleic acid anhydride in molten state at temperature above its melting point (ca 53° C.) i.e. at temperature of 60° C. -80° C., it may be more convenient to add the maleic acid anhydride in the form of a finely divided solid at temperature below the melting point.

Formation of these dispersions or emulsions, may be effected by adding a portion (preferably a minor portion) of the eg maleic acid anhydride in liquid or preferably solid form to a portion (preferably a major portion) of the non-aqueous inert diluent-solvent, typically a naphthenic or paraffinic mineral oil in the presence of a dispersing amount of a dispersing agent typically an alkylamine salt of an alkylbenzene sulfonic acid. It may be desirable to use as inert diluent a mixture of (i) olefin oligomer plus (ii) high boiling diluent-solvent or mineral oil.

With vigorous agitation, the composition is readily formed as a dispersion or emulsion which is stable at temperatures above the melting point of the maleic acid anhydride — typically up to 275° C. or higher.

Although in certain of its embodiments the composition may be a wax or waxy solid at ambient temperature, it is preferably a liquid at the conditions under which it is made and used.

Illustrative emulsion or dispersion compositions may be:

| A. | 10 parts maleic acid anhydride |
| --- | --- |
| | 100 parts 100 E Pale Stock HF (diluent-solvent) |
| | 0.05 parts isopropylammonium dodecylbenzene sulfonate (dispersing agent) |
| B. | 50 parts maleic acid anhydride |
| | 100 parts n-dodecane (diluent-solvent) |
| | 0.50 parts isopropylammonium dodecylbenzene sulfonate (dispersing agent) |
| C. | 20 parts maleic acid anhydride |
| | 100 parts polybutene $\overline{M}_n$ 800 (diluent-solvent) |
| | 1 part isopropylammonium dodecylbenzene sulfonate (dispersing agent) |
| D. | 10 parts maleic acid anhydride |
| | 100 parts polybutene $\overline{M}_n$ 1300 (diluent-solvent) |
| | 0.20 parts hexa ethoxylated nonyl phenol (dispersing agent) |
| E. | 25 parts itaconic acid anhydride |
| | 100 parts polybutene $\overline{M}_n$ 1300 (diluent-solvent) |
| | 0.10 parts, isopropylammonium dodecylbenzene sulfonate (dispersing agent) |

The dispersions or emulsions of anhydride in diluent-solvent may be readily employed to prepare alkenyl saturated aliphatic polycarboxylic, preferably dicarboxylic, acid anhydrides by reaction with an olefin oligomer, or polyolefin, optionally in the presense of catalyst.

The olefin oligomer, or polyolefin, reactant which may be employed may typically be an oligomer of a $C_2$–$C_8$ olefin having a molecular weight $\overline{M}_n$ of 250–5000, preferably 300–3000, say 1280.

The polybutenes which may be employed may include those polymers obtained by polymerizing refinery streams containing eg isobutylenes, cis-butene-2, trans-butene-2, and butene-1. Polymerization of such streams, typically by use of a Friedel-Craft catalyst, permits attainment of a polyisobutylene of $\overline{M}_n$ of 250–3000, preferably 500–2000, say 700–1500, typically 1050–1400, and a viscosity of 4–5500, centistokes at 100° C. Molecular weight $\overline{M}_n$ may be determined by ASTM D-2503 method.

Olefin oligomer may be present in amount of 250–30,000 parts, preferably 500–3000 parts, say 1300 parts total during reaction. When oligomer is employed as diluent-solvent, the amount added as diluent-solvent is credited against the total amount of oligomer to be present during the reaction.

Reaction between the polyolefin and the unsaturated aliphatic dicarboxylic acid anhydride to form the desired product alkenyl saturated aliphatic dicarboxylic acid anhydride may be carried out (with or without catalyst) at 150° C.–300° C., preferably about 210° C.–265° C., say about 245° C. for 2–10, preferably 4–10, say 6 hours at autogenous pressure in batch operation or at 150° C.–300° C., preferably 210° C.–265° C., say about 245° C. for 1–3 hours in a continuous process.

It is a feature of the process of this invention that it may be carried out in the presence of a catalyst such as a brominated phenol (q.v. U.S. Pat. No. 4,278,604) or a brominated dialkylhydantoin catalyst.

The brominated dialkylhydantoin which may be employed as catalyst in one aspect of the process of this invention may include, 1,3-dibromo-5,5-dialkylhydantoins, preferably those bearing $C_1$–$C_{10}$ alkyl groups. The alkyl groups preferably contain a total of 2–21 carbon atoms. Typical of the alkyl groups may be:

TABLE

| methyl |
| --- |
| ethyl |
| propyl |
| butyl |
| amyl |
| hexyl |
| octyl |
| decyl |
| octadecyl etc. |

Illustrative catalysts may include:

TABLE

| 1,3-dibromo-5,5-dimethyl hydantoin |
| --- |
| 1,3-dibromo-5,5-diethyl hydantoin |
| 1,3-dibromo-5,5-di-n-propyl hydantoin |
| 1,3-dibromo-5,5-di-isopropyl hydantoin |
| 1,3-dibromo-5,5-di-cyclohexyl hydantoin |

The preferred hydantoin may be 1,3-dibromo-5,5-dimethylhydantoin.

Reaction may be effected under the following conditions:

TABLE

| | Broad | Preferred | Typical |
| --- | --- | --- | --- |
| Olefin parts | 250–30,000 | 500–3000 | 1300 |
| Inert Diluent, parts | 25–2,000 | 500–1500 | 1000 |
| Anhydride parts | 50–500 | 50–200 | 108 |
| Dispersant parts | 0.005–10 | 0.05–5 | 0.13 |

| | Broad | Preferred | Typical |
|---|---|---|---|
| Mole ratio Anhydride: olefin | 0.5–5 | 0.8–2 | 1.1 |
| Catalyst parts | 0–2000 | 0–150 | 50 |
| Temperature °C. | 150–300 | 210–265 | 245 |
| Pressure psig | 15–500 | 50–200 | 90 |

Clearly when the anhydride is added as a suspension or dispersion in a portion of the oligomer, the amount of oligomer added separately to the reaction zone may be decreased — so that the total mole ratio of anhydride to olefin in the reaction zone may be maintained at the desired level.

In the preferred embodiment, the olefin oligomer is added to the reaction vessel and the dispersion of the maleic acid anhydride is added thereafter. Although it is possible to add the dispersion to the reaction mixture in one aliquot, it is preferred to add it to the reaction mixture gradually over the course of the reaction. When catalyst is employed, it may be added with the oligomer or with the maleic anhydride or both.

Although the temperature of the dispersion of maleic acid anhydride may be sufficiently low so that the anhydride is in the solid state as it is added, it is preferred that the temperature be above the melting point of the anhydride so that the latter is in liquid state as added. It is preferred that the temperature of the dispersion be 60° C.–300° C., say 80° C.–200° C., typically 100° C., although it may be about the same as that of the reaction mixture.

It is also a feature of the process of this invention, that it is possible to prepare product alkenyl succinic acid anhydride containing sludge (as determined by standard procedures known to those skilled in the art) in amounts as low as about 0.9 w %. Comparable control processes wherein the maleic acid anhydride is added without dispersion give products containing 1 w %–10 w %, say 3 w % sludge.

It is also a feature of the process of this invention that it permits attainment of a given amount of product alkenyl succinic acid anhydride by the use of a lesser quantity of maleic acid anhydride — due in part at least to the more efficient use of maleic anhydride. This invention permits operation with mole ratio of maleic acid anhydride olefin reactant of 0.8–1.5:1, preferably 1.0–1.2:1, say 1.1:1. Typical prior art processes employ mole ratios of 1–5:1, preferably 2–3:1, say 2:1.

Work-up of the product may be carried out by distillation of unreacted maleic acid anhydride followed by filtration of the reaction product.

It is also a feature of the process of this invention that the product, typically alkenyl succinic acid anhydride, may if desired be recovered in the presence of the inert diluent. Typically the product may contain about 300–30,500 parts, preferably 550–3200 parts, say 1400 parts of alkenyl succinic acid anhydride and 25–2000 parts, preferably 500–1500 parts, say 1000 parts of inert-diluent-solvent and 0.05–5 parts, preferably 0.01–0.25 parts, say 0.13 parts of dispersant.

It is a feature of the process of this invention that the product may be employed, as is, as an additive to lubricating oils or fuels to provide rust or corrosion inhibition, etc. The product may also be employed in the preparation of alkenylsuccinimides by reaction with mono, di-, or polyamines or aminoalcohols, or in the production of esters of di or poly-hydroxy compounds which are useful as dispersants, detergents, or rust inhibitors or corrosion inhibitors in lubricating oils or fuels.

It will thus be seen that practice of the novel process of this invention permits attainment of advantages including the following:

(i) it insures absence of local high concentration of maleic acid anhydride in the reaction system;
(ii) it facilitates reaction because of the presence of the finely divided anhydride throughout the system;
(iii) it permits attainment of increased yield of desired product;
(iv) it permits operation with production of less sludge, etc.

DESCRIPTION OF PREFERRED EMBODIMENTS

Practice of the process of this invention will be apparent to those skilled in the art from the following examples wherein, as elsewhere in this specification, all parts are parts by weight unless otherwise stated.

EXAMPLE I*

In this control example which shows a typical prior art process, 107.8 parts of maleic acid anhydride is added to a reaction vessel together with 1290 parts of Indopol H-300 brand of polyisobutylene ($\overline{M}_n$ of 1290) oligomer. Mole ration of anhydride to oligomer is 1.1:1. The total reaction mixture occupies 75 v % of the vessel.

The mixture is heated to 245° C. with agitation for six hours at autogenous pressure of 36–73 psig. At the end of this time, the reaction mixture is subjected to distillation at atmospheric pressure to remove unreacted maleic anhydride. The reaction mixture is then filtered hot. The filtrate, Sap #44, contains 57.1 W % product alkenyl succinic acid anhydide and 42.9 w % unreacted polybutene. Unreacted maleic acid anhydride is recovered by distillation. The tar and sludge, is 1.4 w % of the total of the charge maleic acid anhydride plus polybutene.

EXAMPLE II

In this Example which represents practice of a preferred embodiment of this invention, there are added to a reaction vessel 1290 parts of the same Indopol H-300 brand of polyisobutylene ($\overline{M}_n$ of 1290) oligomer.

A dispersion is prepared by adding 107.8 parts of fine solid maleic acid anhydride and 0.14 parts of ICI anionic surfactant G-3300 (isopropylammonium dodecylbenzene sulfonate)as dispersant to 1000 parts of a paraffinic mineral oil, an inert diluent-solvent at 300° C. The mixture is agitated until it is uniform.

The dispersion is added to the reaction mixture as it is agitated at 100° C. and atmospheric pressure. The mole ratio of maleic acid anhydride to olefin is 1.1:1. The reaction mixture is then heated with agitation to 245° C.

At the end of the reaction time of six hours at 245° C. and 100 psig maximum pressure, the reaction mixture is subjected to distillation at reduced pressure (Ca 5mm. Hg) to remove unreacted maleic acid anhydride. The reaction mixture is filtered hot to recover tar and sludge in amount of 0.91 w % of the total charge of maleic acid anhydride plus polybutene. Filtrate includes 65.2 w % polyisobutenyl succinic acid anhydride product and 34.8 w % unreacted polybutene in the diluent oil.

It is apparent from a comparison of Examples I* and II that the yield of desired product has increased from 57.1% up to 65.2% and that the sludge content has decreased from 1.4% down to 0.91%. The amount of unreacted polybutene was decreased from 42.9% w % down to 34.8 w% of the filtrate. This represents a 14% improvement in yield and a 54% decrease in sludge — a significant improvement.

Although this invention has been illustrated by reference to specific embodiments, it will be apparent to those skilled in the art that various changes and modifications may be made which clearly fall within the scope of this invention.

I Claim:

1. The method of preparing a product anhydride of an alkenyl saturated aliphatic polycarboxylic acid which comprises maintaining a reaction mixture at 150° C.–300° C. containing an olefin oligomer reactant of molecular weight $\overline{M}_n$ of 250–5000 and a catalyst;

adding thereto, over the course of reaction, a dispersion containing an anhydride of an unsaturated aliphatic polycarboxylic acid, in amount of 0.5–5 moles per mole of olefin oligomer reactant in said reaction mixture, dispersed, in the presence of dispersing amount of a dispersing agent, in a non-aqueous diluent-solvent thereby forming product anhydride of an alkenyl saturated aliphatic polycarboxylic acid; and recovering said product anhydride of said alkenyl saturated aliphatic polycarboxylic acid.

2. The method of claim 1 wherein said non-aqueous inert diluent-solvent includes a portion of said olefin oligomer reactant.

3. The method of preparing a product anhydride of an alkenyl saturated aliphatic polycarboxylic acid which comprises maintaining a reaction mixture at 150° C.–300° C. containing an olefin oligomer reactant of molecular weight $\overline{M}_n$ of 250–5000 and a brominated phenol or a brominated dialkyl hydantoin catalyst;

adding thereto, over the course of reaction, a dispersion containing an anhydride of an unsaturated aliphatic polycarboxylic acid, in amount of 0.5–5 moles per mole of olefin oligomer reactant in said reaction mixture, dispersed, in the presence of dispersing amount of a dispersing agent, in a non-aqueous, inert, diluent-solvent thereby forming product anhydride of an alkenyl saturated aliphatic polycarboxylic acid; and recovering said product anhydride of said alkenyl saturated aliphatic polycarboxylic acid.

4. The method of preparing a product anhydride of an alkenyl saturated aliphatic polycarboxylic acid as claimed in claim 3 wherein said acid is a dicarboxylic acid.

5. The method of preparing a product anhydride of an alkenyl saturated aliphatic polycarboxylic acid as claimed in claim 3 wherein said unsaturated acid is maleic acid.

6. The method of preparing a product anhydride of an alkenyl saturated aliphatic polycarboxylic acid as claimed in claim 3 wherein said diluent-solvent is a hydrocarbon.

7. The method of preparing a product anhydride of an alkenyl saturated aliphatic polycarboxylic acid as claimed in claim 3 wherein said diluent-solvent is a lubricating oil stock.

8. The method of preparing a product anhydride of an alkenyl saturated aliphatic polycarboxylic acid as claimed in claim 3 wherein said dispersing agent is a non-ionic dispersing agent.

9. The method of preparing a product polybutenyl succinic acid anhydride which comprises maintaining a reaction mixture at 150°–300° C. containing a polybutene oligomer reactant of molecular weight $\overline{M}_n$ of 250–5000 and catalyst;

adding thereto, over the course of reaction, a dispersion containing maleic acid anhydride in amount of 0.5–5 moles per mole of polybutene oligomer reactant in said reaction mixture, dispersed, in the presence of dispersing amount of a dispersing agent, in a non-aqueous, inert, diluent-solvent thereby forming product polybutenyl succinic acid anhydride; and recovering said product polybutenyl succinic acid anhydride.

10. The method of preparing a product anhydride of an alkenyl saturated aliphatic polycarboxylic acid which comprises maintaining a reaction mixture at 150° C.–300° C. containing an olefin oligomer reactant of molecular weight $\overline{M}_n$ of 250–5000 and a brominated hydantoin catalyst;

adding thereto, over the course of reaction, a dispersion containing an anhydride of an unsaturated aliphatic polycarboxylic acid, in amount of 0.5–5 moles per mole of olefin oligomer reactant in said reaction mixture, dispersed, in the presence of dispersing amount of a dispersing agent, in a non-aqueous, inert, diluent-solvent thereby forming product anhydride of an alkenyl saturated aliphatic polycarboxylic acid; and recovering said product anhydride of said alkenyl saturated aliphatic polycarboxylic acid.

* * * * *